A. McWHORTER.
GRASS EDGE TRIMMER.
APPLICATION FILED DEC. 17, 1920.
1,416,106.
Patented May 16, 1922.
2 SHEETS—SHEET 1.
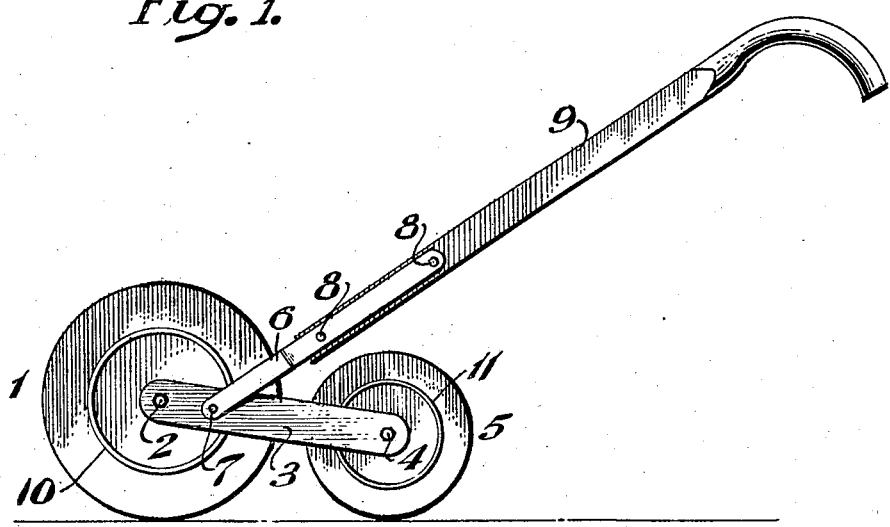
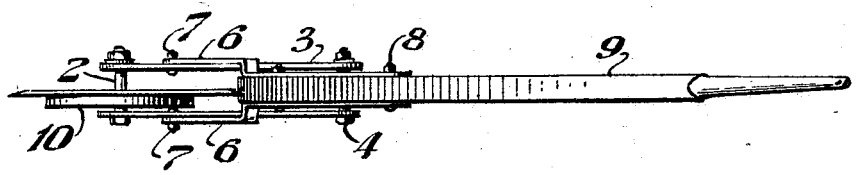
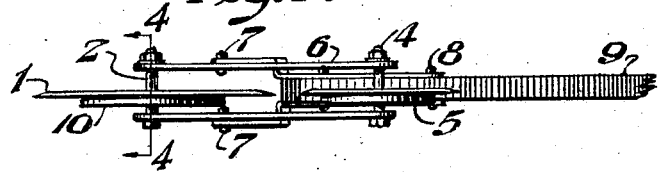
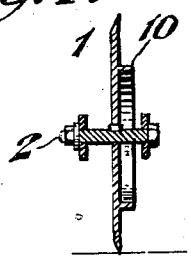
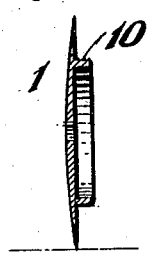
INVENTOR:
Allen McWhorter
BY
Diedersheim & Fairbanks
ATTORNEYS.

A. McWHORTER.
GRASS EDGE TRIMMER.
APPLICATION FILED DEC. 17, 1920.
1,416,106.
Patented May 16, 1922.
2 SHEETS—SHEET 2.
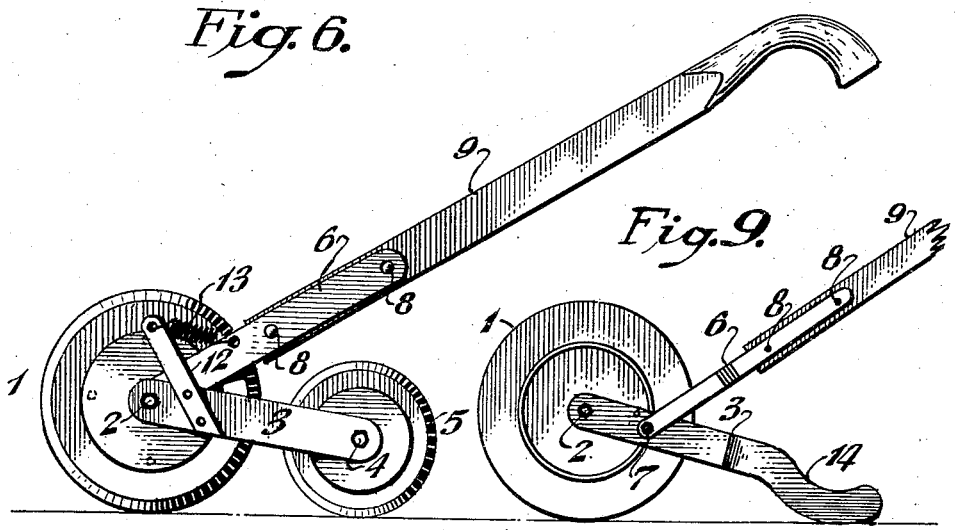
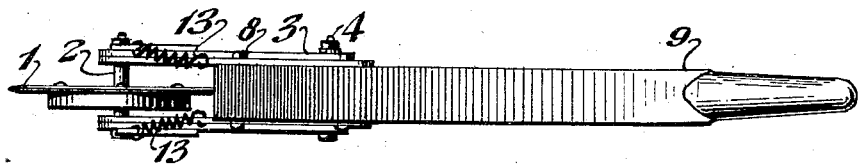
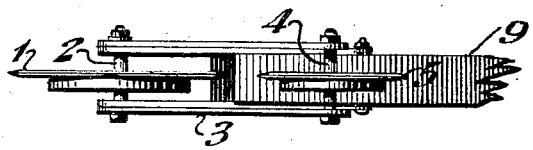
INVENTOR
Allen McWhorter
BY
Diederheim + Fairbanks
ATTORNEYS

UNITED STATES PATENT OFFICE.

ALLEN McWHORTER, OF RIVERTON, NEW JERSEY.

GRASS-EDGE TRIMMER.

1,416,106.   Specification of Letters Patent.   Patented May 16, 1922.

Application filed December 17, 1920. Serial No. 431,344.

*To all whom it may concern:*

Be it known that I, ALLEN MCWHORTER, a citizen of the United States, residing in Riverton, in the county of Burlington, State of New Jersey, have invented a new and useful Grass-Edge Trimmer, of which the following is a specification.

My invention consists of a device for trimming grass along the edge of a cement or like walk, road, path, etc., the same embodying a main rotatable grass shearing blade, a frame on which the same is mounted, said blade being adapted to have its peripheral portion wedged against the side of the walk, etc., and so pressed flat and close against the side of the walk, etc., as to cause the shearing of the grass that hangs over the side of the walk, etc., close to said side, said peripheral portion wedging between the walk, etc., and the sod producing a groove between said parts, parallel therewith, and a trailer mounted on said frame rearward of said main blade in the longitudinal direction thereof adapted to follow said blade in said groove and consisting of a body having a comparatively narrow peripheral edge adapted to enter and run in said groove and thereby guide said main blade and keep it true and steady in its work whereby lateral wabbling or other irregularity in the working of the device is prevented.

Furthermore, the bevel edge of the shearing blade runs against the side of the sod and so causes the wedging of the flat side of said blade flat against the said side of the walk thus also sharpening the shearing edge of said blade.

The invention is satisfactorily illustrated in the accompanying drawing, but the important instrumentalities thereof may be varied, and so it is to be understood that the invention is not limited to the specific details shown and described, as long as they are within the spirit or scope of the claims.

Figure 1 represents a side elevation of a grass edge trimmer embodying my invention.

Figure 2 represents a top plan view thereof.

Figure 3 represents a bottom plan view of a portion thereof.

Figure 4 represents a section of a portion on line 4—4 Figure 3.

Figure 5 represents a diametrical section of a modified form of one of the trimming blades.

Figure 6 represents a side elevation of another embodiment of the invention.

Figure 7 represents a top plan view thereof.

Figure 8 represents a bottom plan view of a portion thereof.

Figure 9 represents a side elevation of another embodiment of the invention.

Similar numerals of reference indicate corresponding parts in the figures.

Referring to the drawings, 1 designates a circular blade forming the main trimmer of the device, the same being mounted by the axial bolt 2 on the forward ends of the straps or bars 3 which are on the opposite sides of said blade and comprises the frame of the device. On the rear ends of said straps there is mounted by the axial bolt 4, the circular rotatable blade or disc 5 which comprises a trailer which is rearward of the blade or trimmer 1 in same longitudinal direction thereof and is adapted to enter the light groove formed by said blade 1 and so serves as a guide and steadier of the latter, as will be hereinafter more fully described, said trailer, however, not being necessarily sharpened to any material extent.

6 designates a fork formed of plates whose forward ends are connected pivotally with the sides of the straps 3 intermediate of the ends of the latter by the bolts 7, said fork having its rear ends firmly connected by the bolts 8 with the handle 9 of the device. The straps or bars 3 are the blade carrying members. The plates of the fork are the members for attaching the bars 3 to the handle 9. The handle 9 is directly longitudinally over the blade 1 and is connected by the plates of the fork 6 with the bars 3 rearward of the axial bolt 2 of said blade by which provision when the device is propelled and so moved forwardly sufficient downward pressure is exerted on the blade 1 to cause its sharp edge to penetrate the ground while some pressure is exerted on the trailer to cause it to enter the groove in the ground formed by the blade 1 and run therein to guide and steady the latter true as previously stated.

On a side of the blade and projecting laterally therefrom is the collar 10 which is concentric with the cutting edge thereof. On a side of the blade 5 and projecting laterally therefrom is the collar 11 which is concentric with the cutting edge of said blade, said collars being of less diameters than the respective blades and form gages for limiting the degree of penetration of the respective cutting edges into the path or road along the lines of grass on said path or road to be cut and trimmed.

It will be seen that as the device is moved against the grass existing along the sides of the path or road, the blade 1 cuts and trims said grass, and the blade 5 follows said blade 1 and finishes the cutting and trimming action. The blades are held down to their work by the downward pressure exerted on the handle 9 and their cutting edges penetrate the ground of the path or road forming light furrows, so that the trailer particularly entering the furrow primarily formed by the advance blade serves to guide the latter true to the work while the collars of the blades limit the degree of penetration of the cutting edges thereof into the ground regulated in a measure by the downward pressure exerted on the handle by the operator.

One side of the blade is flat from said collar 10 to its extreme periphery, whereby said side runs close in contact with the side edge of the lawn, but the other side is beveled from near its peripheral portion to the extreme periphery producing the cutting edge of the blade at the periphery of the flat side thereof serving to press the flat side of the blade tightly against the side wall and so effectively shearing and trimming the grass and thus said cutting edge comes in contact with the grass that overhangs said edge of the lawn and so effectively shears off said grass close up to said edge. The trailer 5 is a blade having thereon the depth gage collar 11, as has been stated, and constructed otherwise similar to the main cutting blade 1 with one side beveled from near its peripheral portion to the extreme periphery itself as shown in Figure 6, while the opposite side is flat as shown in Figure 1, similar to the corresponding side of the main blade as also shown in Figures 1 and 4. Hence the trailer runs parallel and so true along the side edge of the lawn and thereby assists in guiding the main blade true and parallel along said edge, while any grass overhanging said edge that may have escaped being cut by the main blade will be reached by said trailer and so cut that the trimming of the grass at said edge is effectively accomplished. In the embodiment shown in Figures 6, 7 and 8, the fork 6 is mounted on the axial bolt 2 of the blade 1 instead of on the straps 3 as in Figure 1. Rising from and secured to said straps are the arms 12 with whose upper ends are connected the springs 13 which latter are also connected with the fork 6 so that the tendency of said springs is to draw said arms in rearward direction and lower the straps 3 thus forcing down the trailer 5 into the ground and running it true and parallel along the side edge of the lawn while allowing said trailer to rise and lower due to inequalities of the ground, but the handle 9 may also be operated to depress the trailer and main trimmer.

In the embodiment shown in Figure 9, the trailer consists of the shoe 14 of somewhat convex form in lieu of the blade 5, it being continuous of the straps 3 and extending rearward thereof, its lower portion being adapted to enter a furrow made in the ground by the main blade 1 and guide the latter true in its trimming operation, it being adapted to be forced downwardly by proper operation of the handle 9, as in the previous instances.

Having thus described my invention what I claim as new and desire to secure by Letters Patent, is:—

1. A grass edge trimmer consisting of a rotatable grass shearing blade, a frame on which the same is mounted, a handle connected with said frame, said blade having one face formed with a bevel extending to its periphery thereof and the opposite face flat to said periphery, said periphery being adapted to shear the grass overhanging the side of a walk and to form a groove between the walk and sod, and a trailer mounted on said frame rearward of the shearing blade in the same longitudinal direction thereof and consisting of a body having a comparatively narrow periphery adapted to enter and run in said groove and serve to guide said shearing blade true and steady in its work.

2. In a grass edge trimmer, a front rotatable trimming blade, a guiding and steadying device rearward thereof, a member on which said blade and device are mounted, and a handle connected with said member, said handle having its lower end directly over the periphery of said blade.

3. In a grass edge trimmer, a front rotatable trimming blade, a frame on which said blade is mounted, a device longitudinally on the rear of said frame adapted to guide and steady said blade, and a handle adapted to be pivotally connected with said frame rearward of the axis of said blade.

4. In a grass edge trimmer, a rotatable shearing blade, a frame on which the same is mounted, said blade being adapted to shear the grass and to form a groove between a side walk and the sod, and a trailer mounted on said frame rearward of said shearing blade in the same longitudinal direction thereof consisting of a disc having a comparatively narrow periphery adapted to enter and run in said groove formed by the shearing blade.

ALLEN McWHORTER.

Witnesses:
H. B. MARSHALL, Jr.
R. H. SEFTON.